(12) United States Patent
Sherrill et al.

(10) Patent No.: US 10,997,539 B2
(45) Date of Patent: May 4, 2021

(54) SUPPLIER ANALYSIS AND VERIFICATION SYSTEM AND METHOD

(71) Applicant: Walmart Apollo, LLC, Bentonville, AR (US)

(72) Inventors: Edward H. Sherrill, Centerton, AR (US); Donald Lawrence Cook, III, Bentonville, AR (US); Jason Paul McCrory, Bentonville, AR (US)

(73) Assignee: Walmart Apollo, LLC, Bentonville, AR (US)

( * ) Notice: Subject to any disclaimer, the term of this patent is extended or adjusted under 35 U.S.C. 154(b) by 819 days.

(21) Appl. No.: 13/772,926

(22) Filed: Feb. 21, 2013

(65) Prior Publication Data
US 2014/0236661 A1 Aug. 21, 2014

(51) Int. Cl.
*G06Q 10/06* (2012.01)
*G06Q 30/06* (2012.01)

(52) U.S. Cl.
CPC ....... *G06Q 10/06314* (2013.01); *G06Q 30/06* (2013.01)

(58) Field of Classification Search
CPC .................. G06Q 10/06315; G06Q 10/06314
USPC ....................................................... 705/7.25
See application file for complete search history.

(56) References Cited

U.S. PATENT DOCUMENTS

| 8,781,882 B1* | 7/2014 | Arboletti | G06Q 10/0639 705/7.11 |
|---|---|---|---|
| 2002/0143669 A1* | 10/2002 | Scheer | G06Q 10/087 705/28 |
| 2003/0154144 A1* | 8/2003 | Pokorny | G05B 13/0285 705/28 |
| 2007/0136106 A1* | 6/2007 | Hart | G06Q 10/0875 705/4 |
| 2007/0203803 A1 | 8/2007 | Stone et al. | |
| 2012/0023012 A1* | 1/2012 | Brousseau | G06Q 10/06 705/39 |
| 2013/0080183 A1* | 3/2013 | Bond | G06Q 10/08 705/2 |
| 2013/0222116 A1* | 8/2013 | Barry | G06Q 50/22 340/10.1 |

OTHER PUBLICATIONS

Mireille S. Threlkel et al, From traditional EDI to Internet-based EDI: managerial considerations, Journal of Information Technology (1999) 14, 347-360 (Year: 1999).*
International Search Report and Written Opinion for International Application No. PCT/US14/17634 dated Jul. 14, 2014.
(Continued)

*Primary Examiner* — Andre D Boyce
(74) *Attorney, Agent, or Firm* — Fitch, Even, Tabin & Flannery LLP

(57) ABSTRACT

An application and system are capable of taking file formatted data and using that data as an onboarding process to go live with a system to system business document exchange process. Using certain applications and systems, suppliers can automatically validate their data files using a certification tool and can request production of their various products. Certain systems can be operated without human intervention and can accommodate users in a variety of time zones. Certain systems may accommodate parallel validation by a human technician.

14 Claims, 20 Drawing Sheets

(56) References Cited

OTHER PUBLICATIONS

GS1 Europe Member Organisations "EDIINT AS1 and EDIINT AS2 User Guide" [online] published. Jun. 1, 2006 [retrieved on Jun. 9, 2014 (Jun. 9, 2014)] Retrieved from the Internet:URL:http://www.google.com/url?url=http://www.gs1.eu/downloader.php%3Fkfdskf%3D43%26s8skfld2568slk%26%26i%3D8%23l%3D8%26ad%3D234_a&rct=j&frm=1&q=&esrc=s&sa=U&ei=5BakU_y-HsamyAT6hlGYBA&ved=0CB8QFjAA&usg=AFQjCNGbYYJ3kF_EjrcLfOf2me2iv6GA2w>p. 7, p. 17 to p. 20.

\* cited by examiner

▽ Survey

Vendor # 234123
Company Name
Country Code
Are you the EDI contact for your company? ☑Yes ☐No
EDI Contact Retail Link User ID:
EDI Contact Name:
EDI Contact Daytime Phone:
EDI Contact Daytime E-mail:

NOTE  *The 24-hour contact information will only be used in the event of a critical emergency that could jeopardize the information traded between your company and Wal-Mart.*

24-hour Emergency Contact Name:
24-hour Emergency Contact Email:
24-hour Emergency Contact Phone number:

Type of phone number:
☐Direct ☐Corporate ☐Support Desk ☐Pager ☐Business Cell ☐Personal Cell
Are you using a 3rd Party for your AS2 Communication and EDI Translation? ☑Yes ☐No
3rd Party Company Name:
3rd Party Phone #:
3rd Party Email:
3rd Party Contact Name:

PORTAL SURVEY — 802

Page 2 of 4

FIG. 8

Portal2.0

Login as ▶ | DashBoard | Available EDI Transactions | Reporting | Maintain Projects | Survey | Help Documentation | Contact Helpdesk | Other EDI Applications ▶

☆Add to My Homepage    Get Support ▾

Test Data Files

▼ Test Data Files - Test Results for:
Document:Invoice-Basic  Vendor #:545122  Mailbox:x30MMIXq  Direction: To Wal-mart

Summary:
Test Date/ Time : Thu Feb 24 13:23:20 CST 2011

| Test Category | Test | Results |
|---|---|---|
| Envelope Compliance | Deenvelope Test | Pass |
| Envelope Compliance | Envelope Resolve Test | Pass |
| Envelope Compliance | Group Set Test | Pass |
| EDI Compliance | Segment Names Test | Pass |
| EDI Compliance | Input Data Format Test | Pass |
| EDI Compliance | Structural Standards Test | Pass |
| Business Compliance | Business Compliance Test | Pass |

Business Compliance Test Error Report: ← 1201

| Segment Number | Segment ID | Severity | Error Message |
|---|---|---|---|
| 4 | BIG | Warning | Any alpha characters that are present in the BIG-02(Invoice Number) element will not be posted to the accounts payable system. Only numeric characters will be posted. |

Tested Data: ← 1202

| Segment Number | Data |
|---|---|
| 1 | ISA*00*091192139102312313413412123 |
| 2 | ISA*00*091192139102312313413412123 |
| 3 | ISA*00*091192139102312313413412123 |
| 4 | ISA*00*091192139102312313413412123 |
| 5 | ISA*00*091192139102312313413412123 |

Portal2.0 — 1601

Login as ▶ | DashBoard | Available EDI Transactions | Reporting | Maintain Projects | Survey | Help Documentation | Contact Helpdesk | Other EDI Applications ▶

★ Add to My Homepage   Get Support ▼

Document: Invoice    Vendor#: 374249    Mailbox: ToA66MNm    Direction: To Wal-mart    Go to Dashboard

Schedule Production

▽ Setup Data

| | |
|---|---|
| Your ID Qualifier | 08 |
| Your Interchange Identifier | 374249NF |
| Your Identifier Group | 374249NF |
| Walmart's ID Qualifier | 08 |
| Walmart's Interchange Identifier | 925485U500 |
| Walmart's Identifier Group | 925485U500 |
| Data Element Separator | filter off ▽ |
| Segment Terminator | filter off ▽ |
| Component Element Separator | filter off ▽ |
| Unit of measure | filter off ▽ |

1602 →

| Item # | Item Description | Order Qty | UPC # | GTIN # | Vendor Stock # | Dept # |
|---|---|---|---|---|---|---|
| 505819 | Narnia | 9 | 234232165421156 | 25252452462545 | 4314342 | 05 |
| 505819 | Narnia | 9 | 234232165421156 | 25252452462545 | 4314342 | 05 |
| 505819 | Narnia | 9 | 234232165421156 | 25252452462545 | 4314342 | 05 |
| 505819 | Narnia | 9 | 234232165421156 | 25252452462545 | 4314342 | 05 |
| 505819 | Narnia | 9 | 234232165421156 | 25252452462545 | 4314342 | 05 |

1603 ↗

Refresh Item data    Save

▽ Test Data Files

| Sub Usage | Status | Action | Acknowledgement | Must Test |
|---|---|---|---|---|
| 810 - Invoice - Basic | Successful Test (XML) | Upload 810 (View uploaded data) | Download 997 | YES |

Approve Parallel

1605 ↗

▽ Schedule Production

1606 — [📅 Save Date]

Supplier selects a date within 10 business days starting from tomorrow

Save Date

FIG. 16

SUPPLIER ANALYSIS AND VERIFICATION SYSTEM AND METHOD

BACKGROUND

Receiving, verifying, and completing transactions between two businesses can be complicated and prone to numerous errors. Miscommunication when scheduling production and inventory requests from a plurality of different suppliers, vendors, and service providers can result in costly over and under production at improper times and locations. Some of this difficulty has been mitigated with electronic communication systems and formalized standards for exchanging business information.

SUMMARY

According to an embodiment, a computer-implemented method for generating production schedule requests includes receiving a vendor selection from a user and receiving a plurality of documents including a supplier survey from the user. The method further includes verifying at least some of the documents by applying a first plurality of rules. The method further includes determining a plurality of eligible EDI transactions by applying a second plurality of EDI identification rules to the supplier survey, notifying the user of the eligible EDI transactions, providing the user with implementation guides based on the eligible EDI transactions, and exchanging security certificates with the user. The method further includes receiving AS2 information from the user. The AS2 information is associated with at least one of the eligible EDI transactions. The method further includes verifying the AS2 information from the user, receiving a parallel monitor request from the user and determining whether to notify an EDI tech to prepare documentation based on the parallel monitor request. The method further includes prompting the user to schedule a production date based on the AS2 information, receiving the user's scheduling information, emailing approval notification to a vendor associated with the vendor selection, and scheduling production for a plurality of orders based on the user's scheduling information and the vendor associated with the vendor selection.

In some embodiments, the verification rules may include structure validation rules. In some embodiments, the structure validation rules may include a rule ensuring that the date information within a field of at least one of documents is logically consistent with a date when the documents were received. In some embodiments, the verification rules may include business validation rules.

In some embodiments, the method may include forwarding the scheduling information to a human administrator for approval. In some embodiments, determining the eligible EDI transactions may include receiving a selection of EDI transactions to be tested from the user.

According to an embodiment, a non-transitory computer-readable medium includes instructions configured to cause a computer system to receive a vendor selection from a user and receive a plurality of documents including a supplier survey from the user. The instructions are further configured to cause the computer system to verify at least some of the documents by applying a first plurality of verification rules. The instructions are further configured to cause the computer system to determine a plurality of eligible EDI transactions by applying a second plurality of EDI identification rules to the supplier survey, notify the user of the eligible EDI transactions, provide the user with implementation guides based on the plurality of eligible EDI transactions and exchange security certificates with the user. The instructions are further configured to cause the computer system to receive AS2 information from the user. The AS2 information is associated with at least one of the plurality of eligible EDI transactions. The instructions are further configured to cause the computer system to verify the AS2 information from the user, receive a parallel monitor request from the user and determine whether to notify an EDI tech to prepare documentation based on the parallel monitor request. The instructions are further configured to cause the computer system to prompt the user to schedule a production date based on the AS2 information, receive the user's scheduling information, email approval notification to a vendor associated with the vendor selection, and schedule production for a plurality of orders based on the user's scheduling information and the vendor associated with the vendor selection.

In some embodiments, the instructions may be configured to cause the computer system to forwarding the scheduling information to a human administrator for approval. In some embodiments, the instructions may be further configured to cause the computer system to determine a plurality of eligible EDI transactions by receiving a selection of EDI transactions to be tested from the user.

According to an embodiment, a computer system to generate production schedules includes a network input configured to receive a vendor selection from a user, a plurality of documents including a supplier survey from the user, and the user's scheduling information. The computer system further includes a processor operable via instructions stored in a memory to verify at least some of the documents by applying a first plurality of verification rules. The instructions are further configured to cause the computer system to determine a plurality of eligible EDI transactions by applying a second plurality of EDI identification rules to the supplier survey, notify the user of the eligible EDI transactions, provide the user with implementation guides based on the plurality of eligible EDI transactions and exchange security certificates with the user. The instructions are further configured to cause the computer system to receive AS2 information from the user. The AS2 information is associated with at least one of the plurality of eligible EDI transactions. The instructions are further configured to cause the computer system to verify the AS2 information from the user, receive a parallel monitor request from the user and determine whether to notify an EDI tech to prepare documentation based on the parallel monitor request. The instructions are further configured to cause the computer system to prompt the user to schedule a production date based on the AS2 information, receive the user's scheduling information, email approval notification to a vendor associated with the vendor selection, and schedule production for a plurality of orders based on the user's scheduling information and the vendor associated with the vendor selection.

In some embodiments, the instructions may be configured to cause the computer system to forward the scheduling information to a human administrator for approval. In some embodiments, the instructions may be configured to cause the computer system to determine a plurality of eligible EDI transactions comprises receiving a selection of EDI transactions to be tested from the user. In some embodiments, the instructions may be further configured to cause the computer system to receive a request to change a document state. In some embodiments, the AS2 information may include an AS2 Mailbox ID.

According to an embodiment, a method for electronically testing compliance of an electronic commerce transaction document prior to conducting a related electronic commerce transaction between a first business entity and a second business entity includes receiving an electronic request from the first business entity. The electronic request includes a transaction document. The method further includes applying a plurality of rules to the transaction document. The rules are configured to verify compliance with a transaction protocol associated with the second business entity. The method further includes receiving a request to parallel process the transaction document with a human technician, and generating a message to the second business entity based upon the transaction document.

BRIEF DESCRIPTION OF THE DRAWINGS

FIG. 8 is an exemplary screenshot of a vendor survey as can be implemented in certain embodiments.

FIG. 12 is a screenshot depicting the display of test EDI results at a user interface as can appear in certain of the embodiments.

FIG. 16 is a screenshot depicting a user interface for scheduling production.

DESCRIPTION OF EXEMPLARY EMBODIMENTS

Disclosed herein is a specialized electronic commerce portal, system, methods, and application that allow a first business entity (e.g., a supplier) to log into an electronic commerce transaction system of a second business entity (e.g., vendor, retailer or wholesaler) and electronically test and verify that the electronic commerce transaction system of the second business will accept and process an electronic commerce document of the first supplier. This can allow the first business entity to verify and confirm that one or more electronic documents in an electronic format comply with the electronic commerce document rules and requirements of the second business entity prior to trying to use the electronic commerce document to conduct an electronic commerce transaction.

Embodiments taught herein include non-transitory computer readable media, methods, and systems to perform a system to system business document exchange process. The document exchange process may include, for example, one or more electronic commerce transactions, between two parties, for example, a supplier and a vendor or retailer. These embodiments may perform operations using software referred to herein as the Application or Application system 1740. The software may be located on a server referred to herein as the Application server 1805. Using these embodiments, suppliers can log in to the Application server 1805 and automatically validate their data files using a certification tool. Certain embodiments of the Application server 1805 can accommodate validation by a human technician. By placing electronic commerce transactions through the Application server 1805, suppliers may more easily and more efficiently conclude electronic commerce transactions with other business entities, such as vendors.

Figure 1:
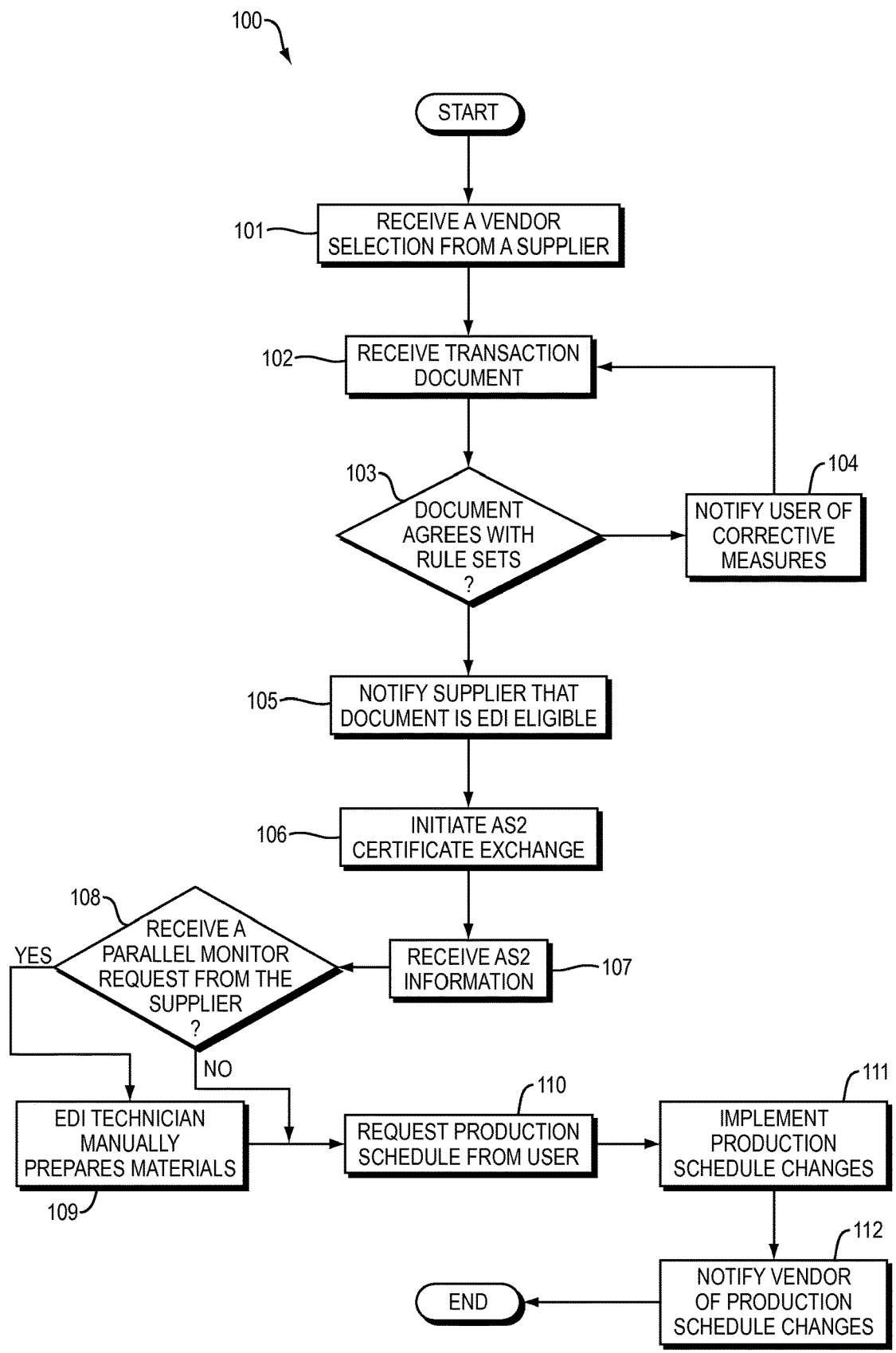
FIG. 1 is a flow diagram generally depicting certain aspects of a production scheduling process implementing certain features of certain embodiments of the Application system disclosed herein.

FIG. 1 is a flow diagram generally depicting certain aspects of a production scheduling process implementing certain features of certain embodiments of the Application system 1740 as taught herein. The process can begin at step 101 by receiving a vendor selection from a user. The user can be a supplier who wishes to schedule production by the vendor of a particular product. Although the user will generally be referred to as a supplier in the following examples for purposes of explanation, and the receiving business entity as a vendor, one will recognize that anyone wishing to perform a transaction may serve as a user and anyone capable of receiving documents may serve as the second business entity.

At step 102 the system receives an electronic transaction document in electronic form from the supplier. The document can include an Electronic Data Interchange (EDI) document containing specific details for the vendor to begin production.

At step 103 the Application 1740 can determine whether the transaction document agrees with one or more rules contained in a plurality of rule sets. The plurality of rule sets can be located in memory 1716 in some embodiments on the Application server 1805, or may be stored separately in a storage database 1736. If the electronic commerce transaction document fails or does not meet one of the rules in the rule set, this indicates that there are one or more errors in the document. The Application system 1740 can notify the supplier and request correction at step 104. The supplier can then correct the documents until they pass each rule in the rule set. Once the document passes the rule sets of step 103 the system can notify the supplier that the document is EDI eligible at step 105.

At step 106 the Application system 1740 can then initiate an Applicability Statement 2 (AS2) certificate exchange to authenticate the supplier and to begin processing the order. Once the supplier is verified after receipt of the AS2 information at step 107, the system can then provide the supplier an opportunity to specify whether they prefer that their request be parallel monitored by a human technician at step 108. If the supplier responds with a parallel monitor request, the system can request that an EDI technician manually prepare materials in conjunction with the automated system at step 109.

At step 110 Application system 1740 can then request a production schedule from the supplier, or can identify the schedule within the transaction document from step 102. At step 111 Application system 1740 can then implement the production schedule changes. At step 112 the system can then notify the vendor of the production schedule changes, such as by a system email, before the process ends.

Figure 2:
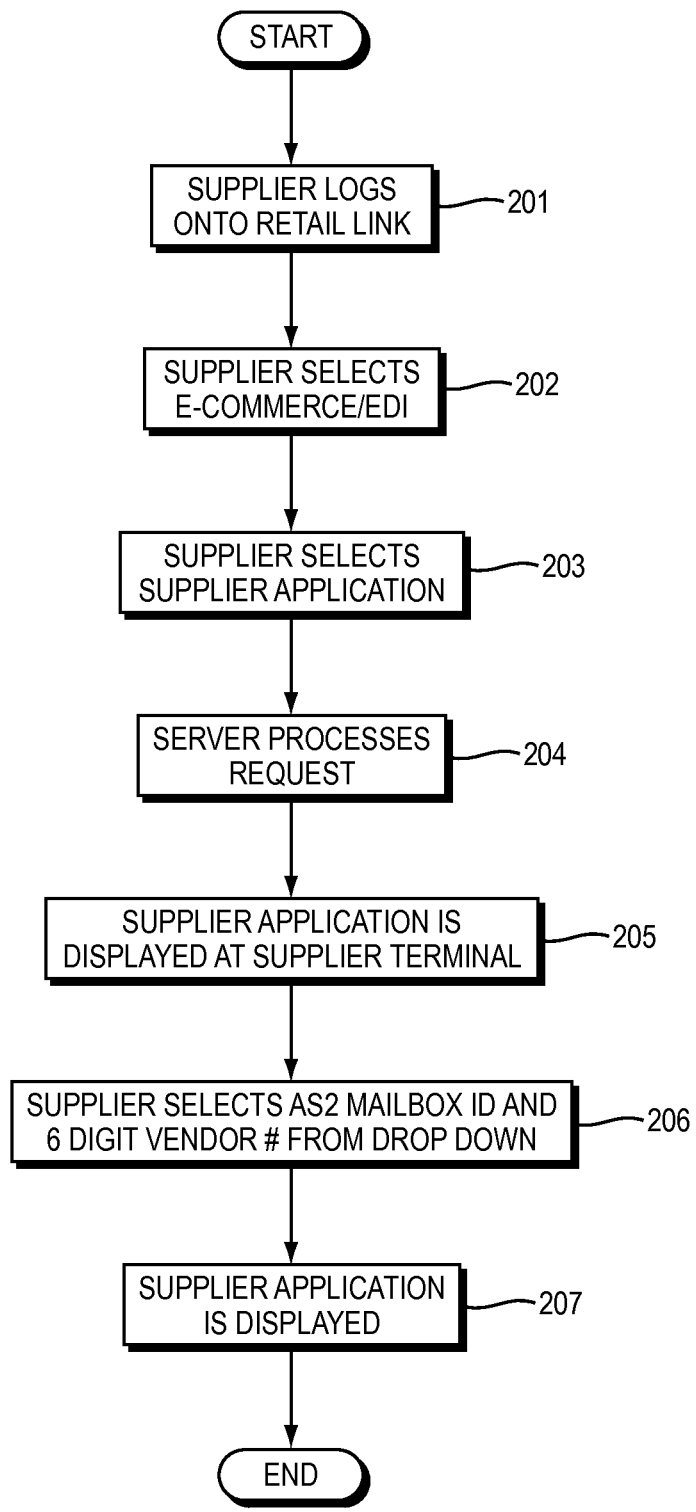
FIG. 2 is a flow diagram depicting the steps by which a user can initiate a session with the Application system.

FIG. 2 is a flow diagram depicting the steps by which a supplier can initiate a session with the Application system 1740. At step 201, the supplier can log on to a retail link and at step 202 can select "E-commerce/EDI". The retail link can include a portion of a webpage, such as part of a general website dedicated to providing supplier services. At step 203, the supplier can initiate an Application session which can cause the Application 1740 to begin processing the supplier's request at step 204. At step 205, this can cause the supplier Application interface to be displayed at the supplier's terminal. At step 206, the supplier can select an AS2 mailbox ID, or equivalent identifying feature, and enter their unique identifier via the Application interface. At step 207, an interface to the supplier application can be displayed on the user's screen. These elements can be used to verify the supplier's identity and to avoid fraudulent use of the Application system 1740. Following authentication the system can begin the operation and function of the Application 1740.

Figure 3:
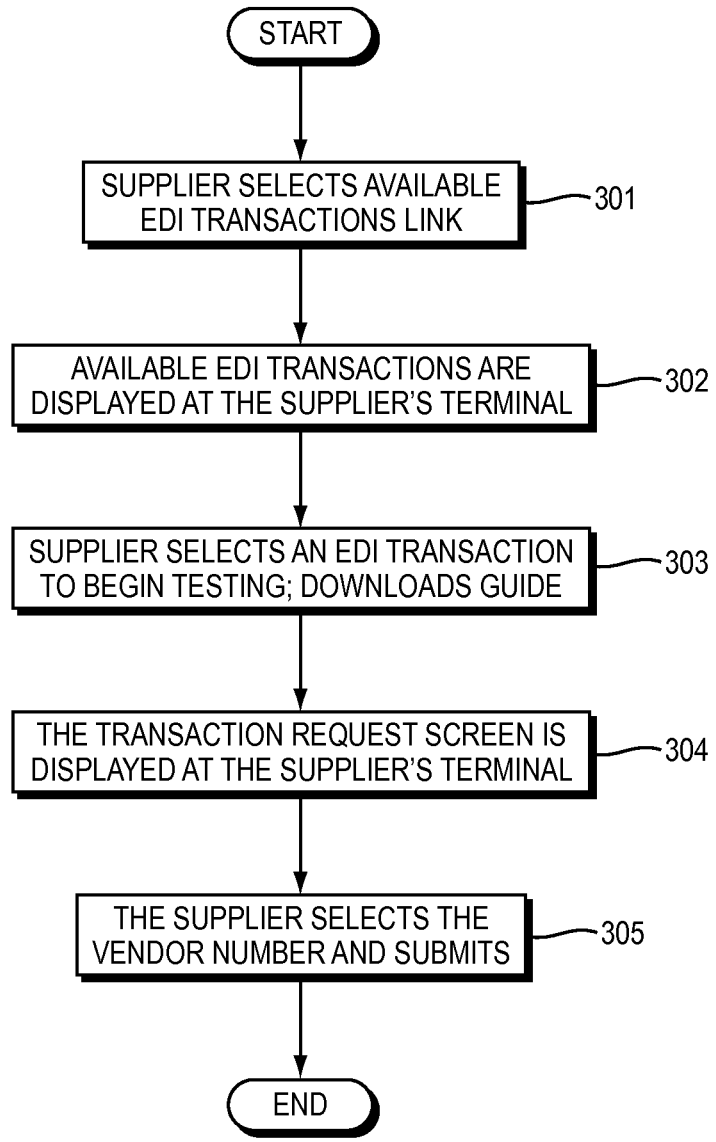
FIG. 3 is a flow diagram depicting the steps by which a user can select a transaction.

As discussed with respect to step 102, the system can receive a transaction document following authentication. A plurality of different transactions and corresponding documents can be handled by the Application system 1740. FIG. 3 is a flow diagram depicting the steps by which a supplier can select a transaction. At step 301, the supplier can select the available EDI transactions link from the webpage interface displayed at the supplier's terminal. This can cause the system to display the available EDI transactions screen at step 302. The supplier can select an EDI transaction to begin testing at step 303 causing the system to display the transaction request interface at step 304. At step 305, the supplier can then select a vendor. Although the selection is depicted as occurring at step 305, the user may select the vendor at this point or prior to selecting a transaction. For example, the vendor selection can proceed in tandem or following the selection of the transaction type.

Figure 4:
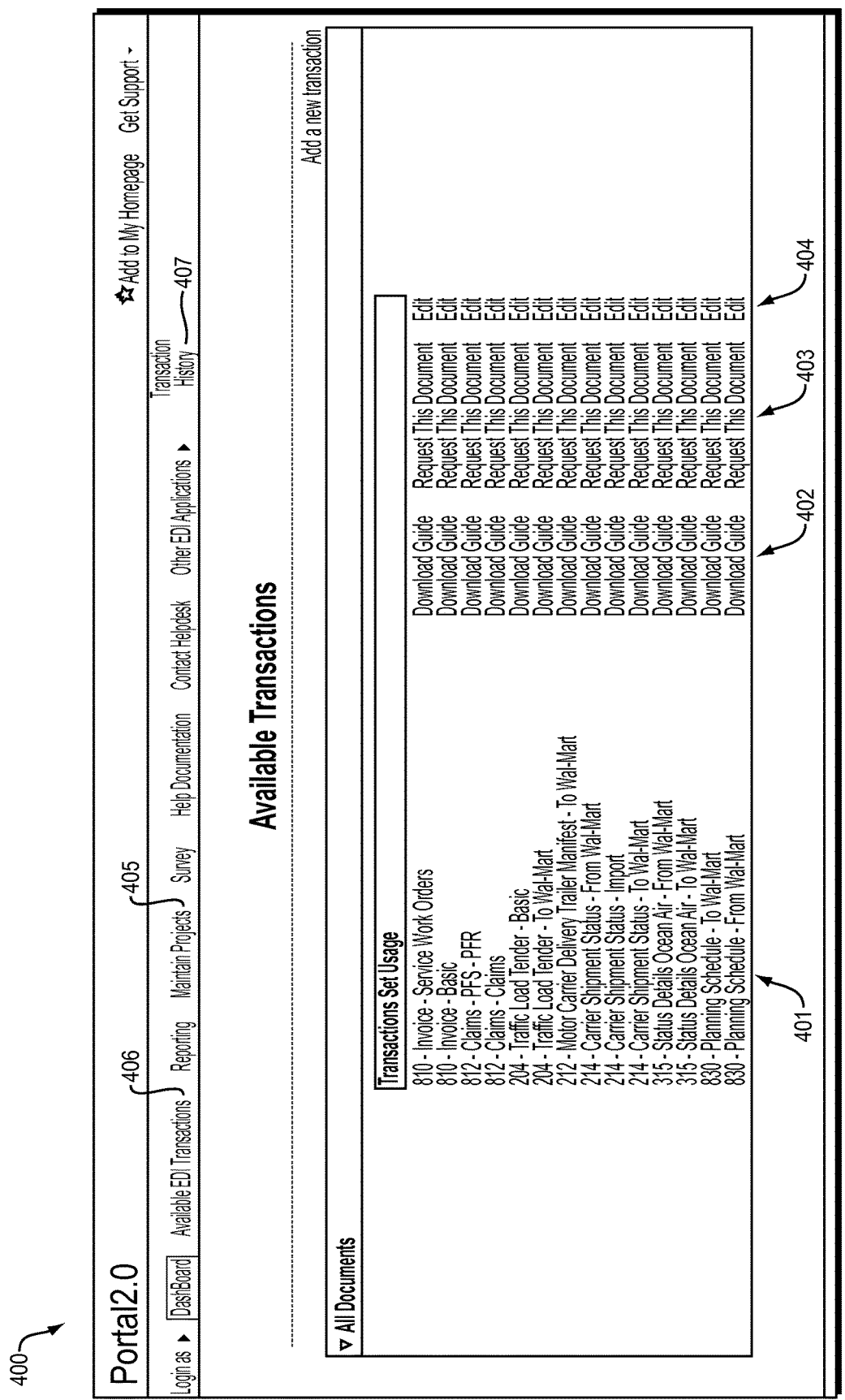
FIG. 4 depicts an exemplary screenshot of a user interface displaying available functionality as can be provided in certain embodiments of the Application system.

FIG. 4 depicts a graphical user interface 400 displaying available transactions as can be provided in certain embodiments of the system. The interface can include a navigation bar 405 for selecting among operations and functions. As depicted, the supplier has selected the "Available EDI Transactions" tab 406 from the operations.

The "Available EDI Transactions" tab can include a table, or window, depicting a list of transactions 401. For each transaction, the Application 1740 can provide a link to download a guide 402. The guide can lead the supplier through the necessary steps to complete the transaction. The system can also provide URL links to request the document associated with the transaction 403 and to edit the transaction document 404.

Figure 5:
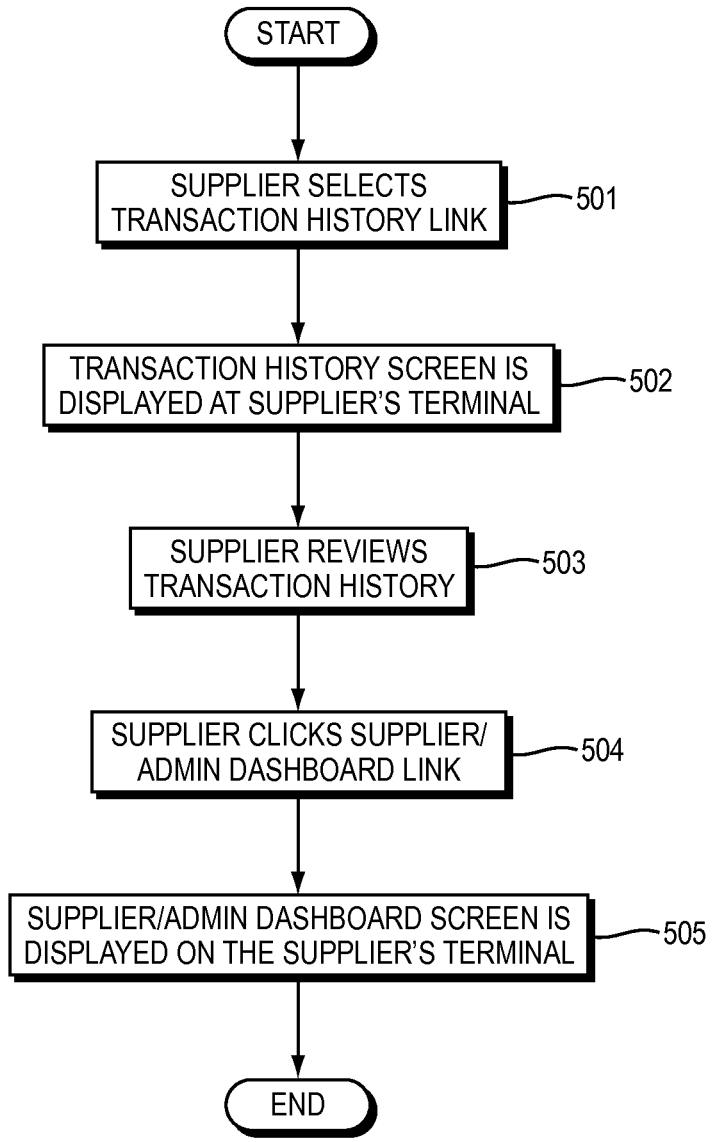
FIG. 5 is a flow diagram depicting the steps by which a user can select a transaction before proceeding to the administrative link.

FIG. 5 is a flow diagram depicting the steps by which a user can select a transaction before proceeding to an administrative link. After the supplier selects the transaction history link URL 407 at step 501, Application system 1740 can display the transaction history screen at step 502. The transaction history screen interface can be similar to the interface of FIG. 4. At step 503, the supplier can then review the past transactions, select the administrative dashboard at step 504, and begin editing entries on the dashboard once the dashboard is displayed at step 505.

Figure 6:
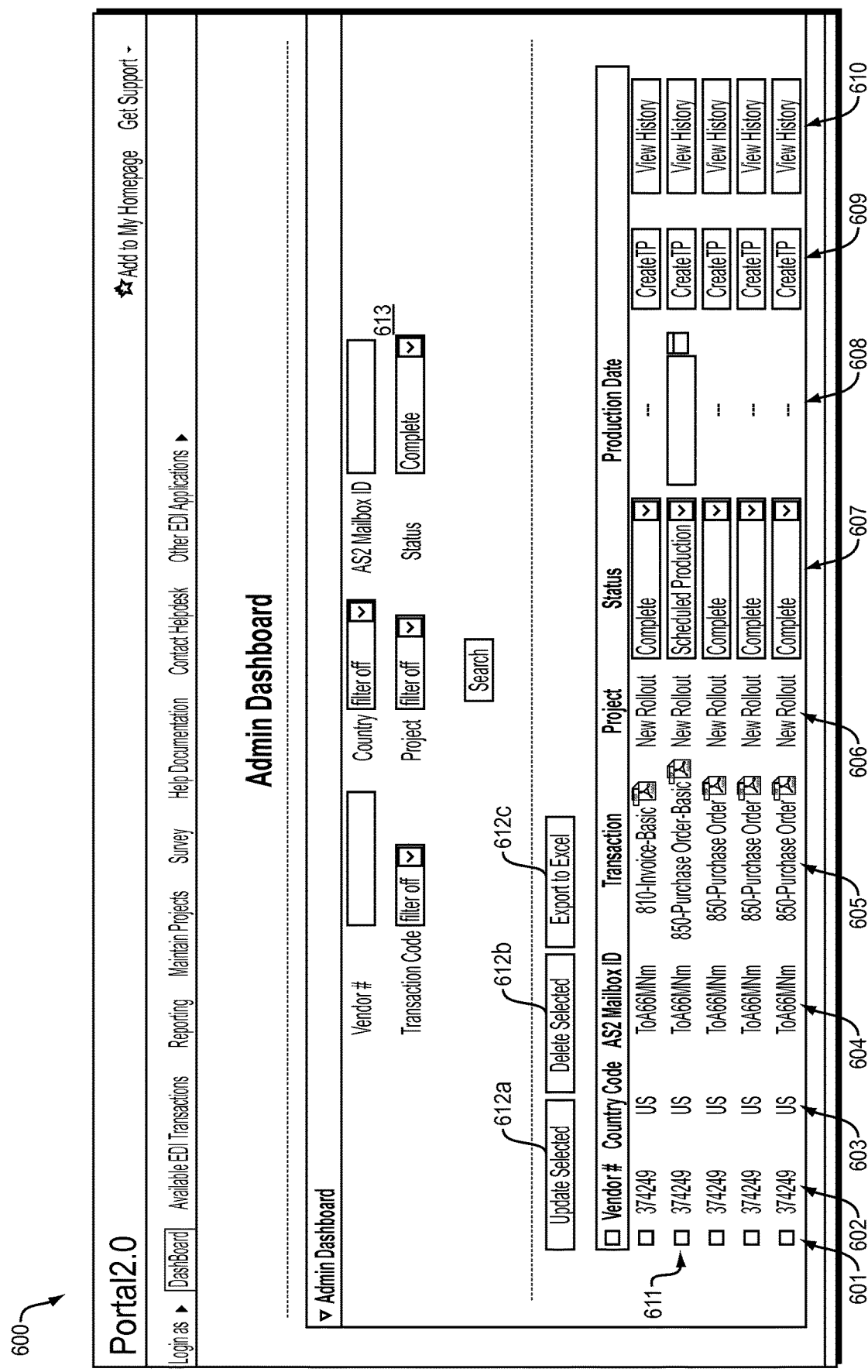
FIG. 6 is an exemplary screenshot depicting a user interface provided in certain embodiments for administrative dashboard functionality and monitoring of various vendors.

FIG. 6 is an exemplary screenshot depicting an user interface 600 in certain embodiments for providing administrative dashboard functionality and monitoring of various vendors. The dashboard can include a plurality of vendor entries 611. Each vendor entry can include a selection box 601, a vendor number 602, country code 603, an AS2 Mailbox ID 604, link to a transaction document 605, project title 606, status 607, production date 608 (if applicable), TP creation button 609, and history view 610. One will understand that various of these columns can be removed or replaced with variations on this functionality. AS2 Mailbox ID 604 can display the AS2 mailbox as a unique identifier for the supplier agent initiating the transaction. Alternative unique identifiers, such as a social security number or arbitrary sequences of alphanumeric characters, can also be used in some embodiments. Status 607 can indicate the character of the transaction's current behavior, such as "complete", "scheduled for production", etc. History view 610 when selected, can provide a list of significant events in the transaction's creation and execution.

Figure 7:
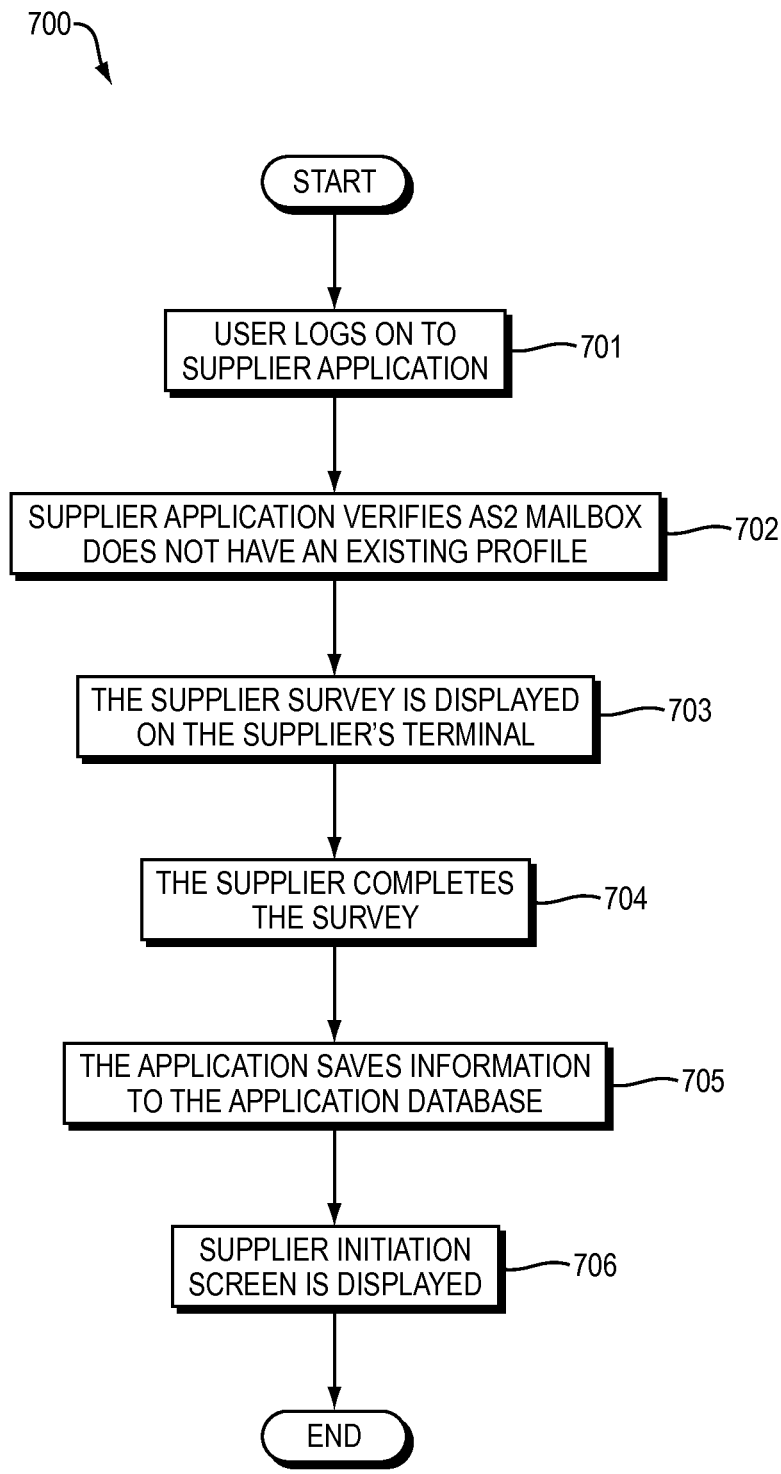
FIG. 7 is a flow diagram depicting the steps by which a supplier can encounter, complete, and submit a survey for processing.

FIG. 7 is a flow diagram depicting the steps by which a supplier can receive, complete, and submit a survey for processing. These steps can occur following receipt of the AS2 information at step 107 in FIG. 1, though one will recognize variations in the exchange flow. The supplier can log in to the Application 1740 at step 701. The Application 1740 can then verify the AS2 mailbox information, or other unique identification at step 702 for security purposes (FIG. 1 step 107). The system can then display a supplier survey at step 703. At step 704, the supplier can then complete the survey and at step 705 the Application 1740 can save the information to an Application database (e.g., database 1734). The Application system 1740 can then display the supplier initiation screen 706 to the supplier at the supplier's terminal.

FIG. 8 is an exemplary screenshot of a vendor survey 800 as can be implemented in certain embodiments. The vendor survey 800 can include a plurality of forms such as the one depicted here. Each form can include a column of field names 801 and a column of field entries 802. The field names and entries can each be directed to information relevant to the survey, such as the vendor's name, country code, EDI contact name, etc.

Figure 9:
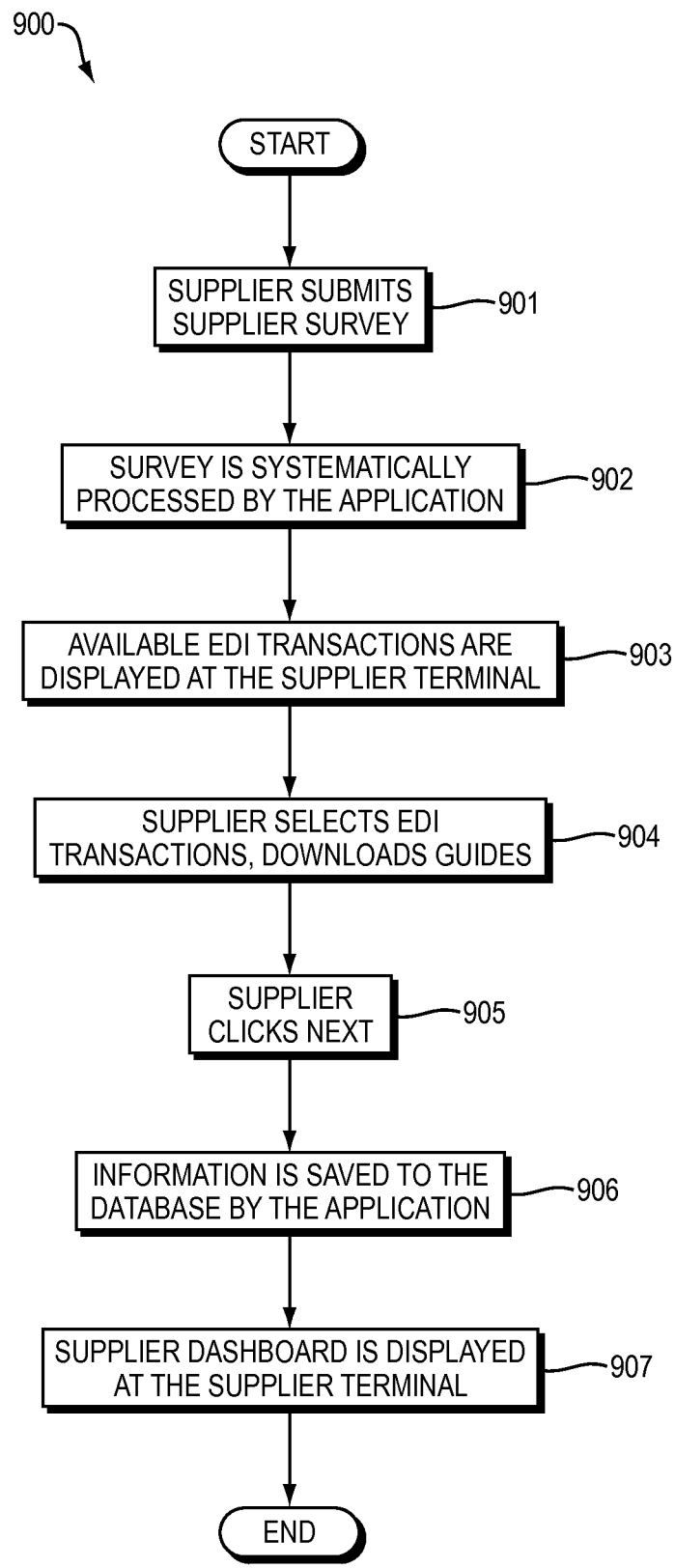
FIG. 9 is a flow diagram depicting the Application operations which can follow processing of the vendor survey.

FIG. 9 is a flow diagram depicting the Application operations which can follow processing of the vendor survey. At step 901, the supplier can submit the survey which is then processed by the Application system 1740 at step 902. Based upon the survey contents, the system can then display the available EDI transactions upon the supplier terminal at step 903. At step 904, the supplier can then select the pertinent EDI transactions and download guides. Once the supplier completes the transaction operations at step 905 the supplier can save the information to the database at step 906. The Application system 1740 can then display the supplier dashboard at the supplier terminal at step 907.

Figure 10:
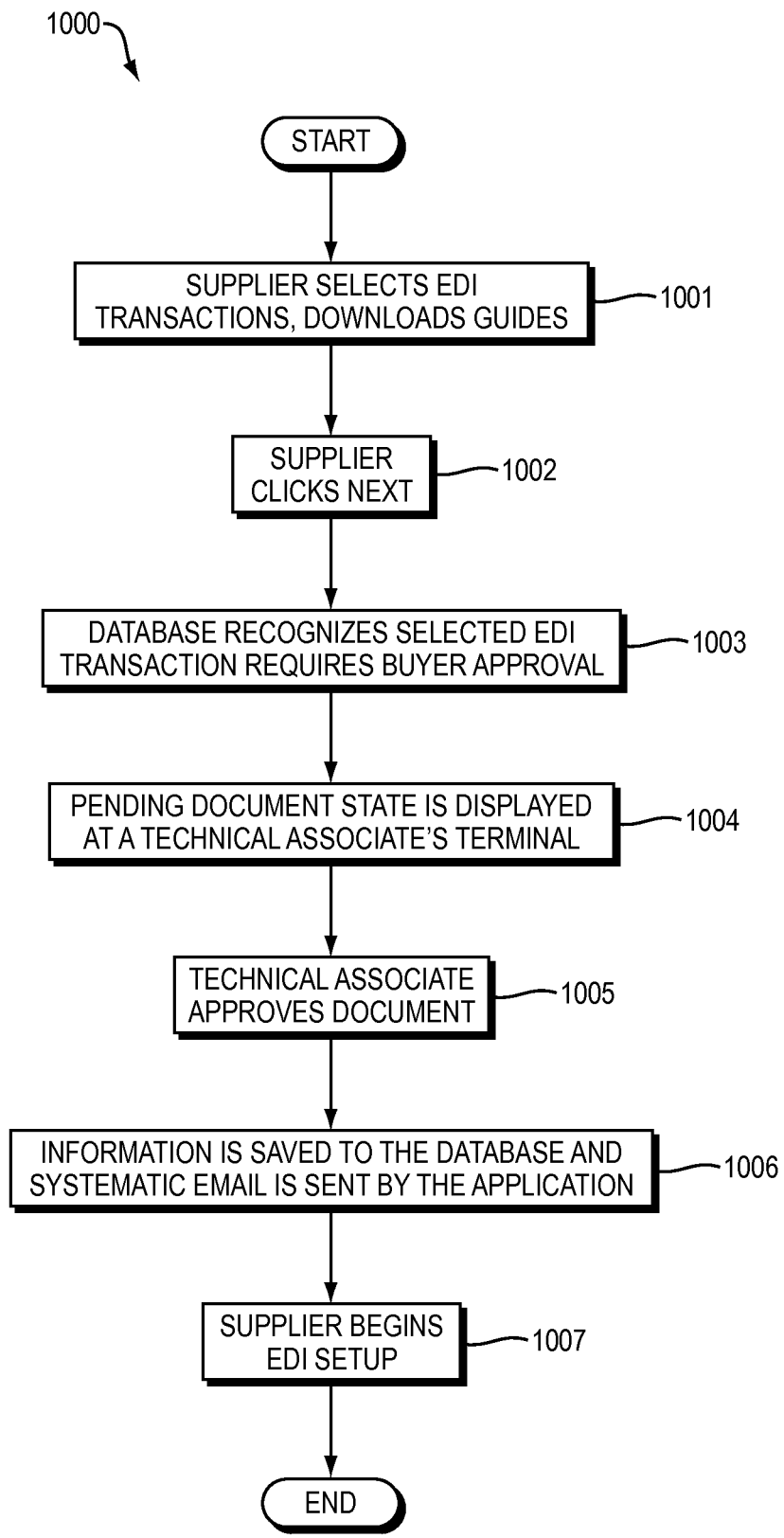
FIG. 10 is a flow diagram depicting the steps by which the system and user initiate Electronic Data Interchange (EDI) setup.

EDI transactions can sometimes require further processing. FIG. 10, for example, is a flow diagram depicting the steps by which the Application system 1740 and user initiate an Electronic Data Interchange (EDI) setup. In this example, at step 1001 the supplier selects EDI transactions and downloads relevant guides. Following submission by the user at step 1002, however, Application system 1740 determines that the selected transaction requires buyer approval at step 1003. At step 1004, the Application system 1740 can display the pending document state at a technical associate's terminal. The technical associate can approve the document as step 1005. At this point the information can be saved to the system 1006 and the supplier can begin EDI setup 1007.

Figure 11:
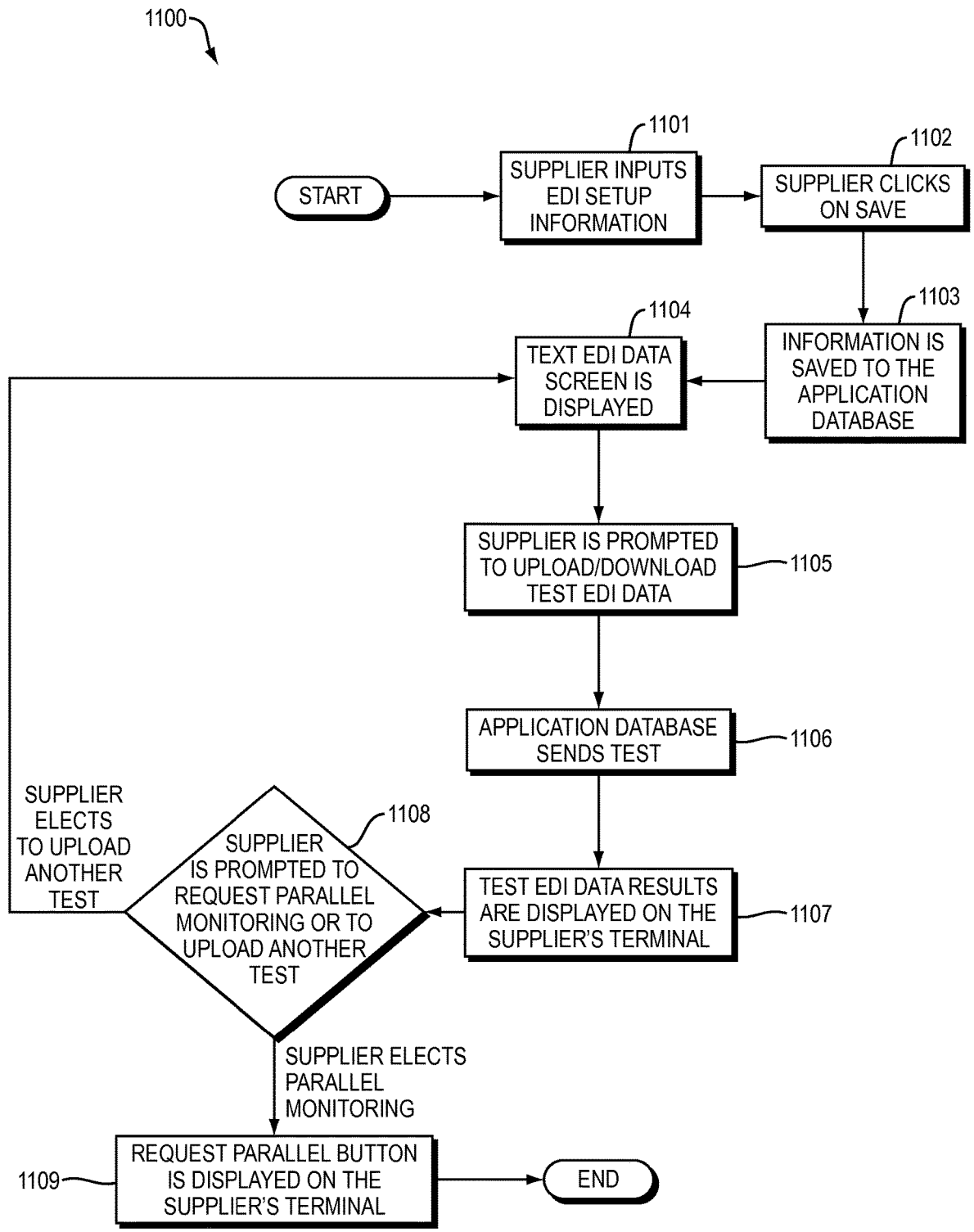
FIG. 11 is a flow diagram depicting the steps by which the system and user initiate EDI testing and begin parallel monitoring.

FIG. 11 is a flow diagram depicting the steps by which the system and user initiate EDI testing and begin parallel monitoring if parallel monitoring is selected. At step 1101, the supplier inputs EDI information and submits the information at step 1102 to the system. At step 1103 the system saves the information to the Application database 1736. The test EDI data screen can then be displayed at step 1104 on the supplier's screen. The supplier can be prompted to upload/download test EDI data at step 1105. At step 1106, the Application system 1740 can then send a test. The EDI test results can then be displayed at the supplier terminal at step 1107. At step 1108, the supplier can be prompted, at the supplier's terminal, to decide whether they wish to request parallel monitoring or if they wish to upload another test. If the supplier decides to upload another test, the process returns to step 1104. If the supplier instead selects parallel monitoring, the request parallel monitoring button can be displayed at step 1109.

FIG. 12 is a screenshot depicting the display of test EDI results at a user interface as can appear in certain of the embodiments. The test data display can include a test listing 1201, a business compliance report 1202 and the test data segment display 1203.

Figure 13:
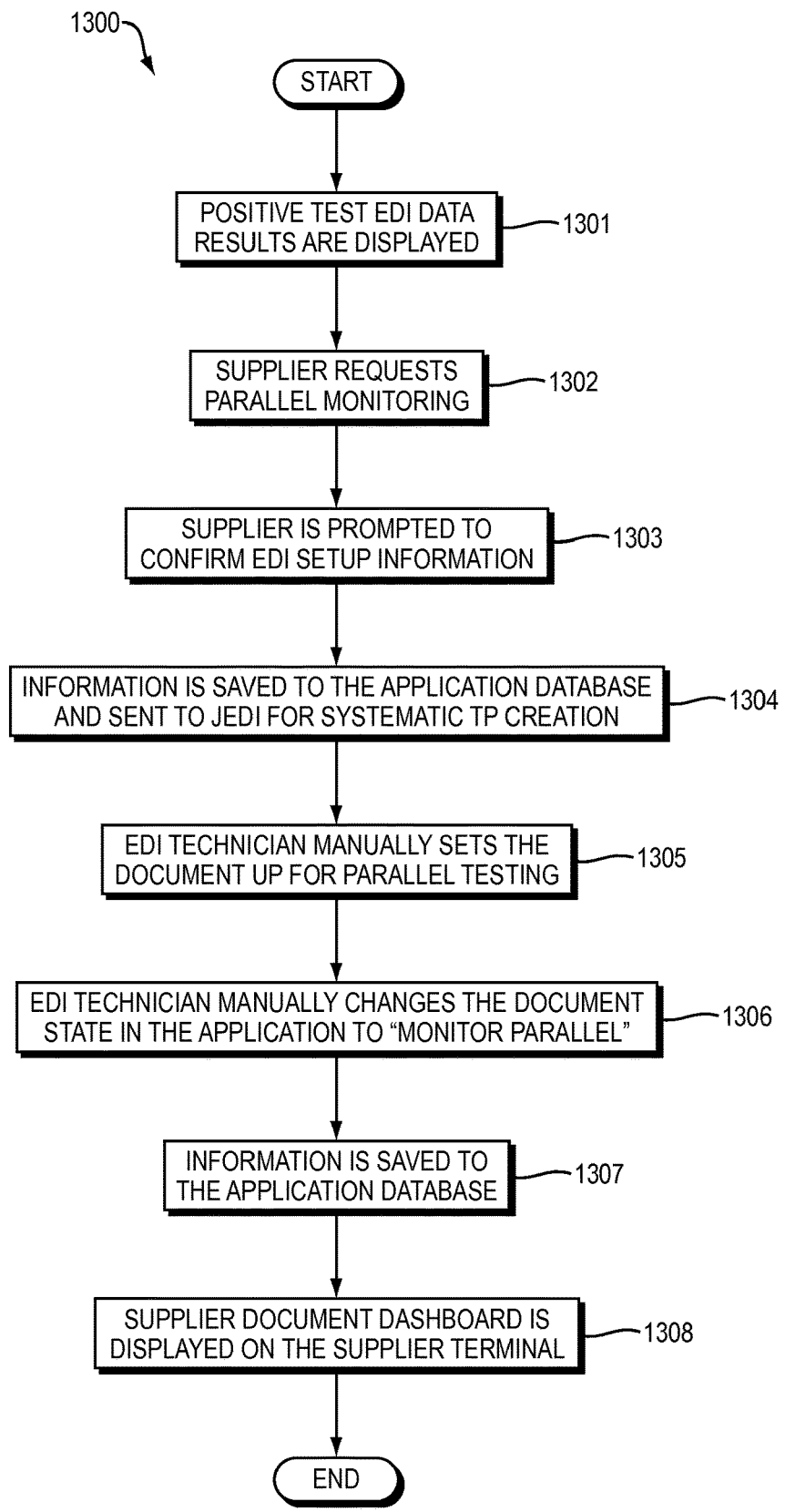
FIG. 13 is a flow diagram depicting the steps by which parallel monitoring can occur.

FIG. 13 is a flow diagram depicting the steps by which parallel monitoring can occur in certain embodiments. At step 1301, the Application system 1740 can display positive EDI test results on the supplier terminal. Subsequently, at step 1302, the supplier can request parallel monitoring and can then be prompted to confirm EDI setup information at step 1303. At step 1304, this information can be saved to the database. At step 1305, an EDI technician can manually set the document up for parallel testing and can change the document set in the Application to "monitor parallel" at step 1306. At step 1307, this information can be saved in the Application database. At step 1308 the supplier document can be displayed on the dashboard of the supplier terminal.

Figure 14:
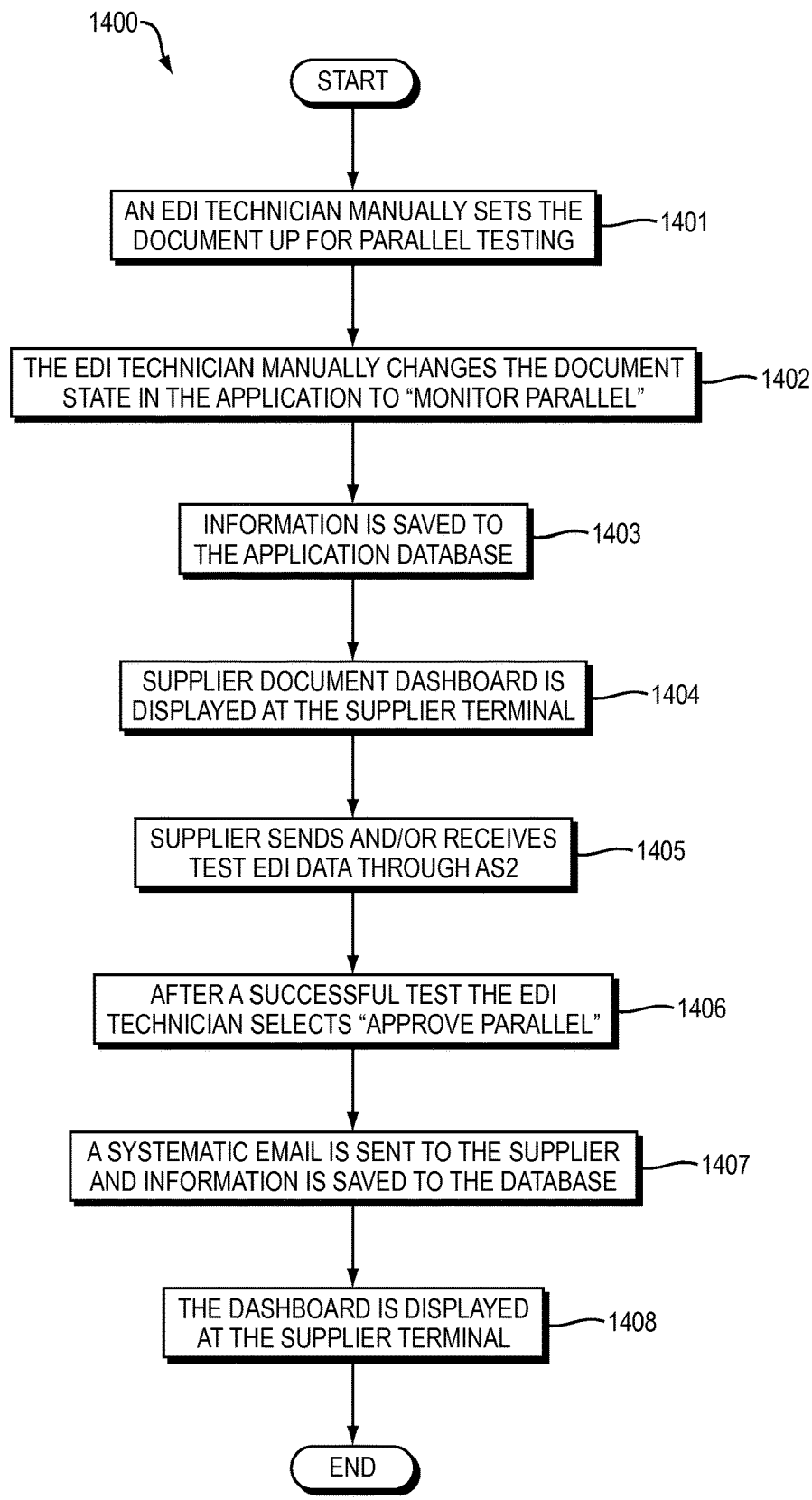
FIG. 14 is a flow diagram depicting the steps by which parallel monitoring can occur and a system email sent.

FIG. 14 is a flow diagram depicting the steps by which parallel monitoring can occur and a system email sent to the supplier. At step 1401, the EDI technician can manually set up the document for parallel testing. At step 1402, he EDI technician can then manually change the document state in the Application system 1740 to "monitor parallel". At step 1403, the technician can save this information to the Application database. At step 1404 the supplier document dashboard can then be displayed at the supplier terminal. At step 1405, the supplier can then send/receive test EDI data through AS2. Once the testing completes successfully at step 1406, the EDI technician selects "approve parallel". At step 1407, a systematic email can then be sent by Application system 1740 to the supplier and the information saved to the database. At step 1408, the Application system 1740 may then display the administration dashboard at the supplier's terminal.

Figure 15:
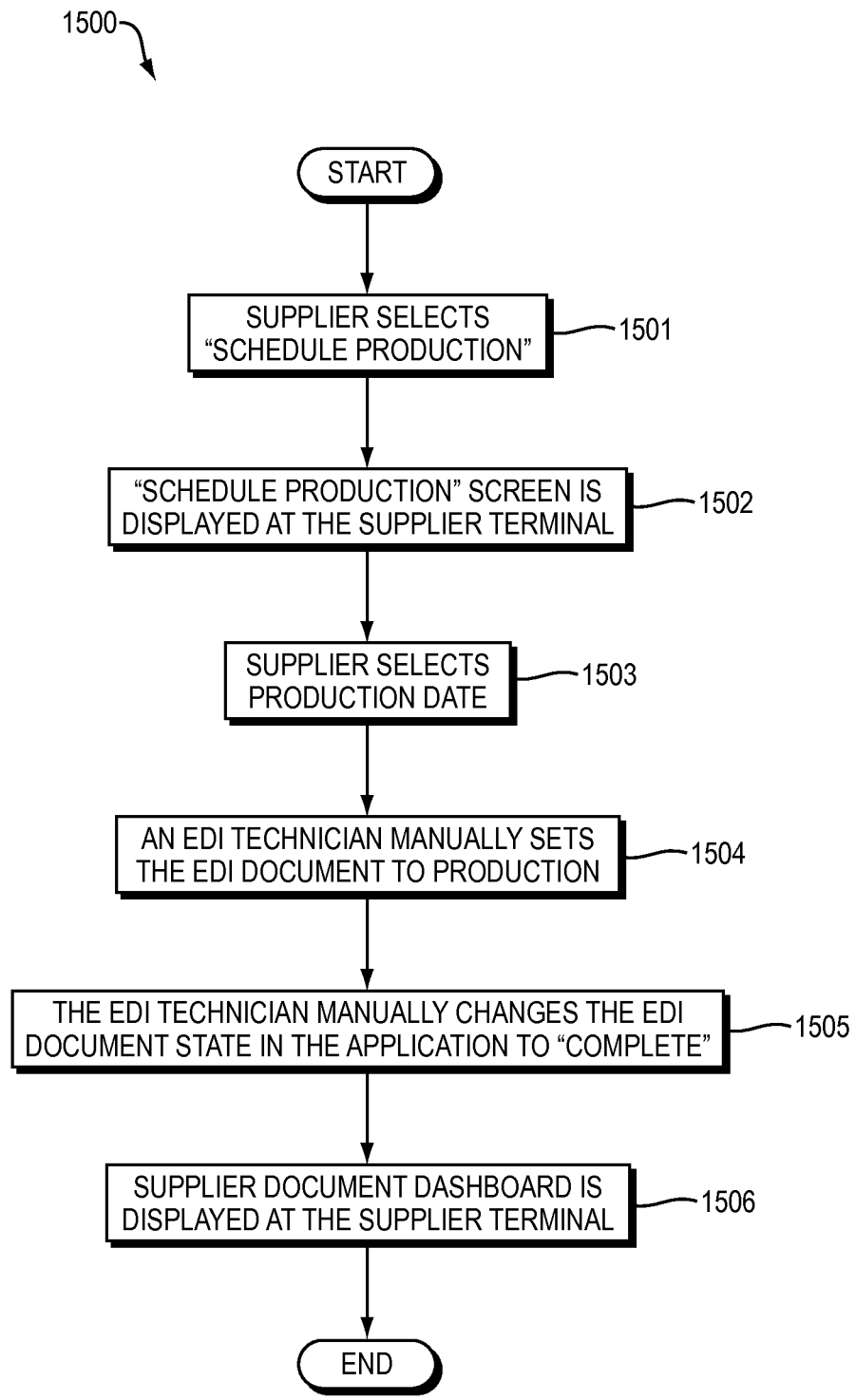
FIG. 15 is a flow diagram depicting the steps by which production is scheduled.

FIG. 15 is a flow diagram depicting the steps by which production is scheduled. At step 1501, A supplier can select "schedule production". At step 1502 the system can then display the production screen at the supplier's terminal. At step 1503, the supplier can then select a production date. At step 1504, an EDI technician can manually set the EDI document to production. At step 1505, the EDI technician can then change the EDI document state to "complete" within the Application system. At step 1506, the system can then display the supplier document dashboard at the supplier terminal.

FIG. 16 is a screenshot of a graphical user interface for scheduling production. The interface can include a navigation bar 1601. The interface can also include a plurality of fields concerning the character of the production order 1602. A listing of the items to be produced, and in what quantity, can be provided 1603. The test data file corresponding to this request can also be referenced via section 1605. The supplier can specify a start date in the field 1606. Here, in this example, the start date must be within some threshold period of the production submission to avoid confusion and order backlog.

Figure 17:
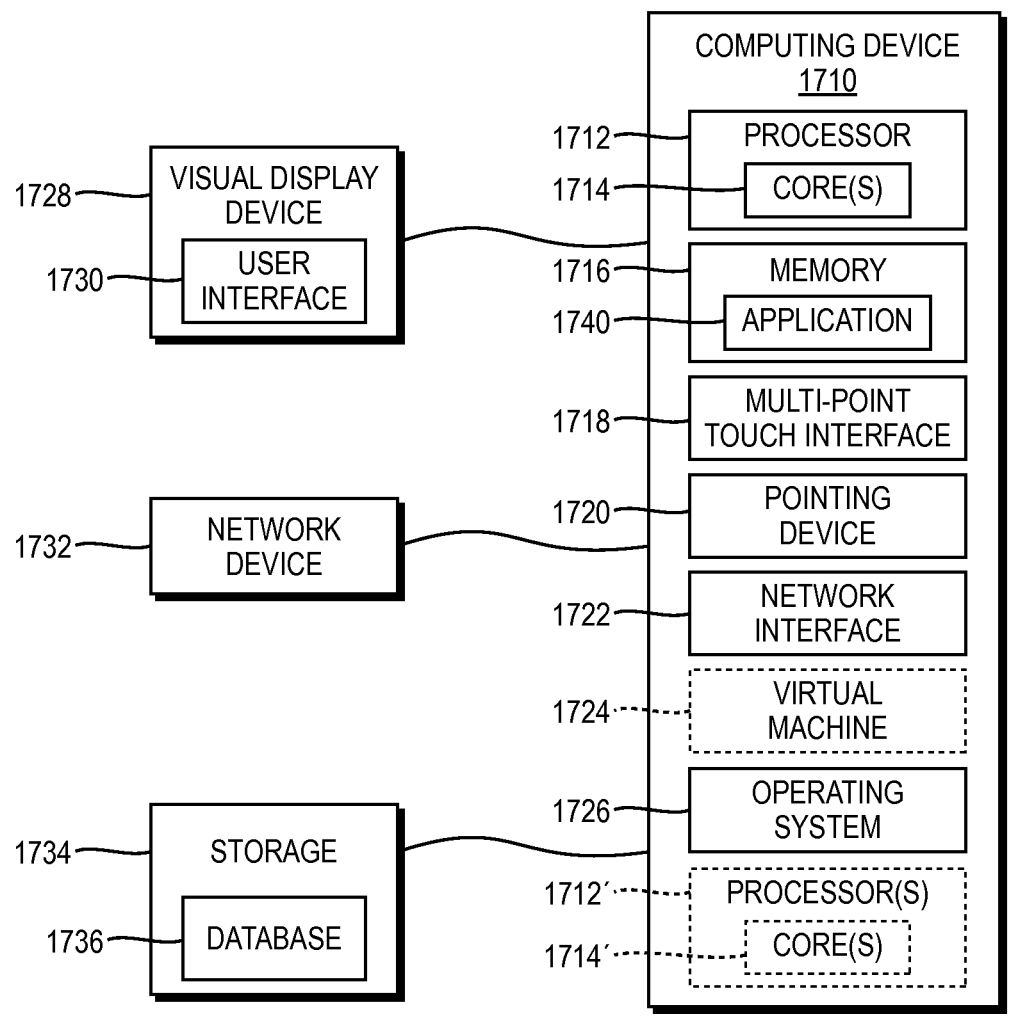
FIG. 17 is an exemplary block diagram depicting a computing device programmed and/or configured to implement certain embodiments of the present disclosure.

FIG. 17 is a block diagram of an exemplary computing device 1710 such as can be used, or portions thereof, in implementing Application system 1740. The computing device 1710 includes one or more non-transitory computer-readable media for storing one or more computer-executable instructions or software for implementing exemplary embodiments. The non-transitory computer-readable media can include, but are not limited to, one or more types of hardware memory, non-transitory tangible media (for example, one or more magnetic storage disks, one or more optical disks, one or more flash drives), and the like. The computing device 1710 can also include configurable and/or programmable processor 1712 and associated core 1714, and in some embodiments, one or more additional configurable and/or programmable processing devices, e.g., processor(s) 1712' and associated core(s) 1714' (for example, in the case of computer systems having multiple processors/cores), for executing computer-readable and computer-executable instructions or software stored in the memory 1716 and other programs for controlling system hardware. Application 1740, for example, may be stored in the memory 1716. Processor 1712 and processor(s) 1712' can each be a single core processor or multiple core (1714 and 1714') processor.

Virtualization can be employed in the computing device 1710 so that infrastructure and resources in the computing device can be shared dynamically. A virtual machine 1724 can be provided to handle a process running on multiple processors so that the process appears to be using only one computing resource rather than multiple computing resources. Multiple virtual machines can also be used with one processor.

Memory 1716 can include a computer system memory or random access memory, such as DRAM, SRAM, EDO RAM, and the like. Memory 1716 can include other types of memory as well, or combinations thereof.

A supplier can interact with the computing device 1710 through a visual display device 1728, such as a computer monitor, which can display one or more user interfaces 1730 that can be provided in accordance with exemplary embodiments. The computing device 1710 can include other I/O devices for receiving input from a supplier, for example, a keyboard or any suitable multi-point touch interface 1718, a pointing device 1720 (e.g., a mouse). The keyboard 1718 and the pointing device 1720 can be coupled to the visual display device 1728. The computing device 1710 can include other suitable conventional I/O peripherals.

The computing device 1710 can also include one or more storage devices 1734, such as a hard-drive, CD-ROM, or other non-transitory computer readable media, for storing data and computer-readable instructions and/or software for performing various of the operations and functions taught herein. Exemplary storage device 1734 can also store one or more databases for storing any suitable information required to implement exemplary embodiments. The databases can be updated by manually or automatically at any suitable time to add, delete, and/or update one or more items in the databases. In some embodiments the Application 1740, or portions thereof, may be stored on storage device 1734 rather than memory 1716.

The computing device 1710 can include a network interface 1722 configured to interface via one or more network devices 1732 with one or more networks, for example, Local Area Network (LAN), Wide Area Network (WAN) or the Internet through a variety of connections including, but not limited to, standard telephone lines, LAN or WAN links (for example, 802.11, T1, T3, 56 kb, X.25), broadband connections (for example, ISDN, Frame Relay, ATM), wireless connections, controller area network (CAN), or some combination of any or all of the above. The network interface 1722 can include a built-in network adapter, network interface card, PCMCIA network card, card bus network adapter, wireless network adapter, USB network adapter, modem or any other device suitable for interfacing the computing device 1710 to any type of network capable of communication and performing the operations described herein. Moreover, the computing device 1710 can be any computer system, such as a workstation, desktop computer, server, laptop, handheld computer, tablet computer, or other form of computing or telecommunications device that is capable of communication and that has sufficient processor power and memory capacity to perform the operations described herein.

The computing device 1710 can run any operating system 1726, such as any of the versions of the Microsoft® Windows® operating systems, the different releases of the Unix and Linux operating systems, any version of the MacOS® for Macintosh computers, any embedded operating system, any real-time operating system, any open source operating system, any proprietary operating system, or any other operating system capable of running on the computing device and performing the operations and functions described herein. In exemplary embodiments, the operating system 1726 can be run in native mode or emulated mode. In an exemplary embodiment, the operating system 1726 can be run on one or more cloud machine instances.

Figure 18:
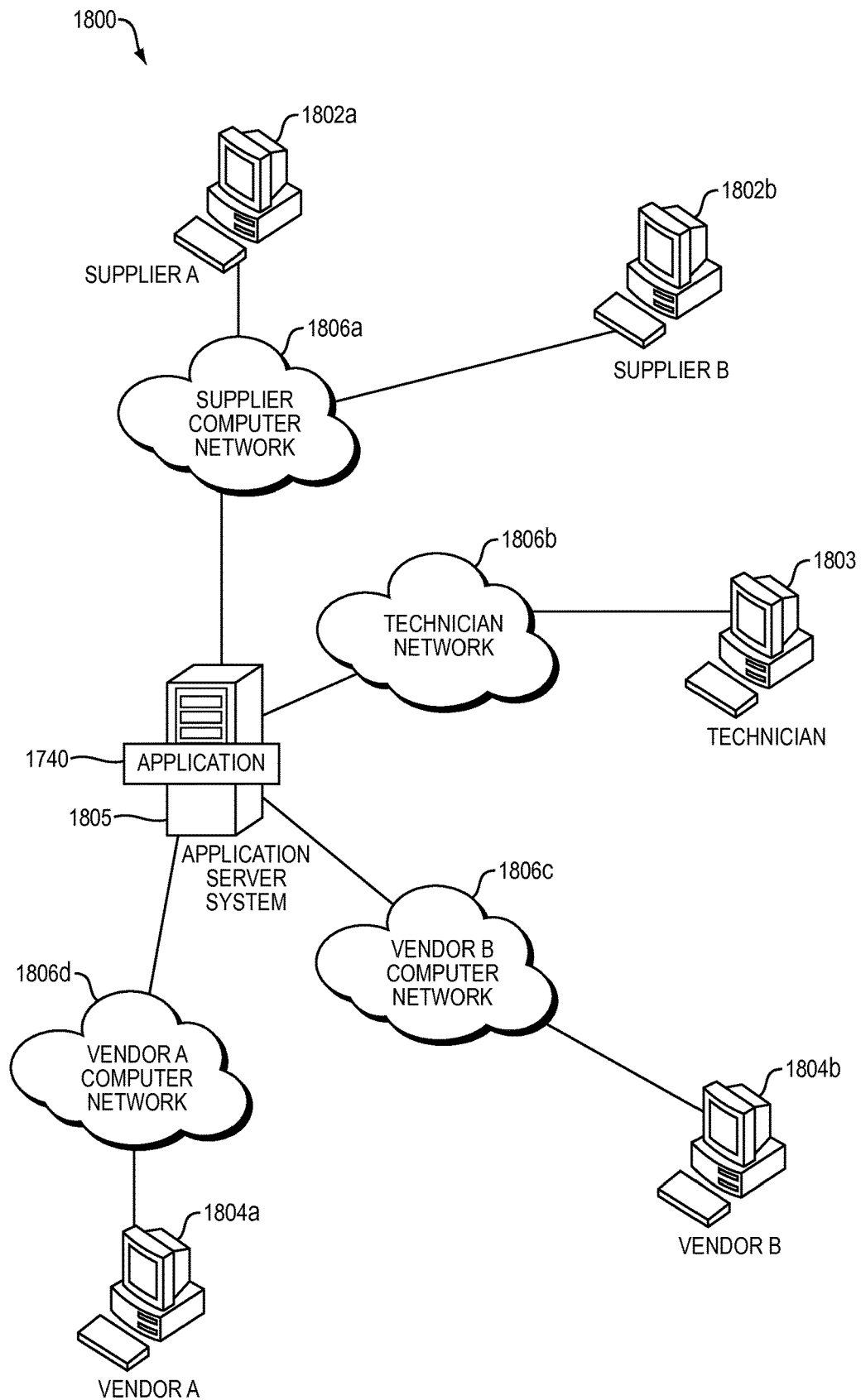
FIG. 18 is a block diagram showing the arrangement of a supplier, Application system, and a plurality of vendors.

FIG. 18 is an example block diagram showing the arrangement 1800 of supplier terminals 1802*a,b*, a technician terminal 1803, a plurality of vendor terminals 1804*a,b* and an Application server system 1805. The supplier terminal 1802*a*, can be used by a product supplier who wishes, for example, to communicate with a vendor terminal 1804*a,b* to issue a production request or to arrange for an inventory transfer. The vendor terminals 1804*a,b* can each operate using a different internal business communications systems and organizational methods. Accordingly, it can be difficult for the suppliers 1802*a,b* to communicate directly and in an automated manner with the vendor terminals 1804*a,b*. The Application server system 1805 can facilitate communication between the supplier terminals' 1804*a,b* respective internal computer systems and the internal computer systems of the vendor terminals 1804*a,b* via computer networks 1806*a-d*. Though shown separately here, one will recognize that the computer networks 1806*a-d* can be a single network (such as when each network is a portion of the Internet) or can be a combination of networks in certain embodiments. In some embodiments, computer network 1806*b* may not exist and the Application 1740 can be directly connected with the technician's 1803 system, or be located thereon (e.g., where terminal 1803 and server system 1805 are the same system). In some embodiments, Application 1740 can be located on AIX virtual servers. From the technician terminal 1803, a technician can monitor the interaction between the supplier at supplier terminal 1802*a,b* and the vendors 1804*a,b* and in some embodiments can intercede to ensure appropriate communication between their computer networks. In some embodiments, the technician 1803 can perform the Application's transfer operations in parallel to ensure that orders are properly fulfilled as described in greater detail above.

Figure 19:
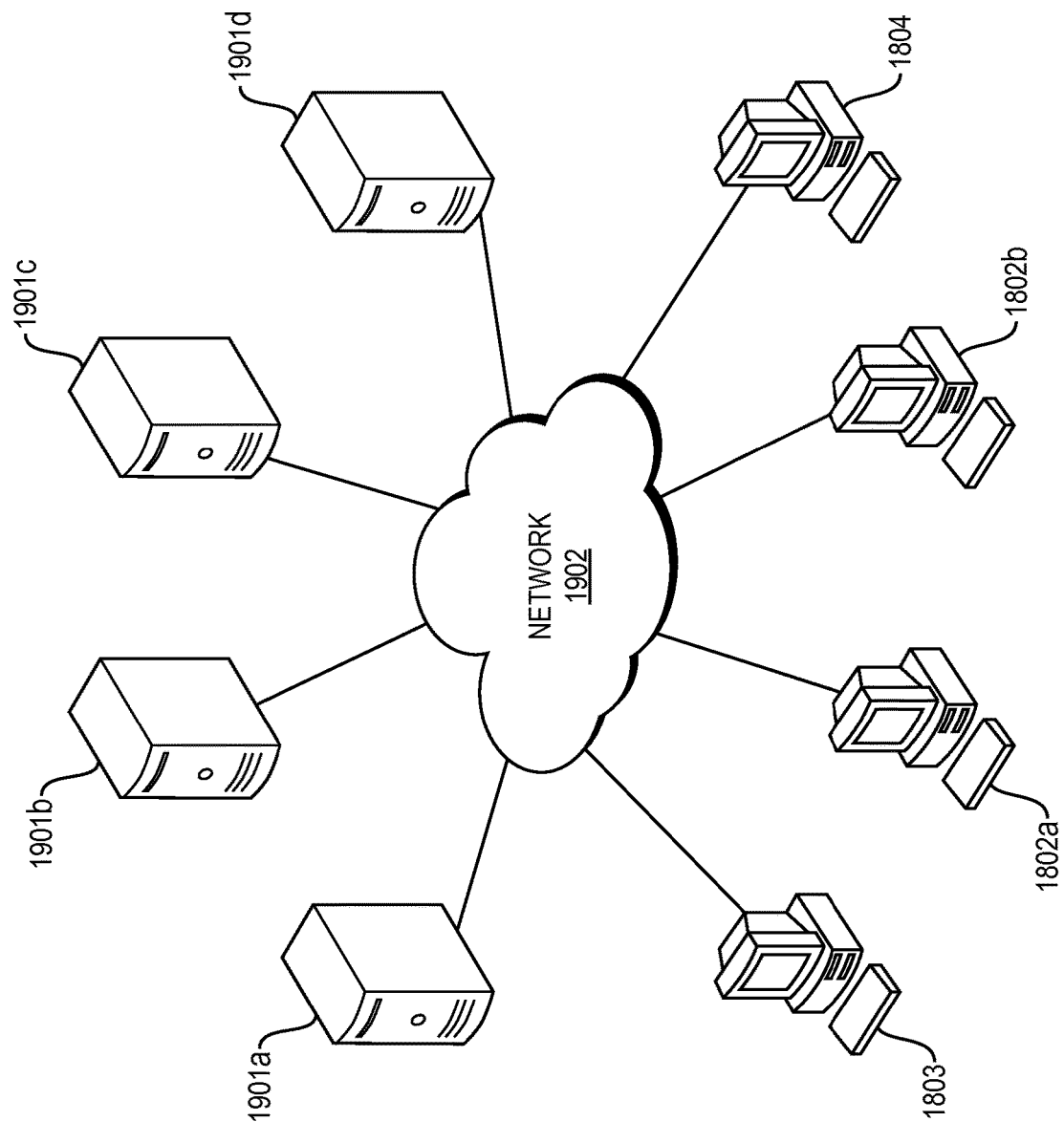
FIG. 19 is an example computational device block diagram depicting various of the components which can be used to implement various of the disclosed embodiments in a distributed system.

FIG. 19 is an example computational device block diagram of certain distributed embodiments. Although FIGS. 17, 18, and the exemplary discussion above, occasionally make reference to a single computational system 1710, one will recognize that various of the modules within computational system 1710 may instead be distributed across a network 1902 in separate server systems 1901*a-d* and possibly in user systems, such as the terminals 1803, 1804, and 1802*a,b* of the suppliers, vendors, and technicians. For example, users may download an application to their terminal 1803, which is configured to perform various of the operations of FIG. 1. In some distributed systems, the modules of computational device 1710 can be separately located on server systems 1901*a-d* and can be in communication with one another across the network 1902. In some systems, certain operations of Application 1740 discussed in FIG. 1 may be performed on one device across the network while other operations of Application 1740 are performed on one or more other devices.

Figure 20:
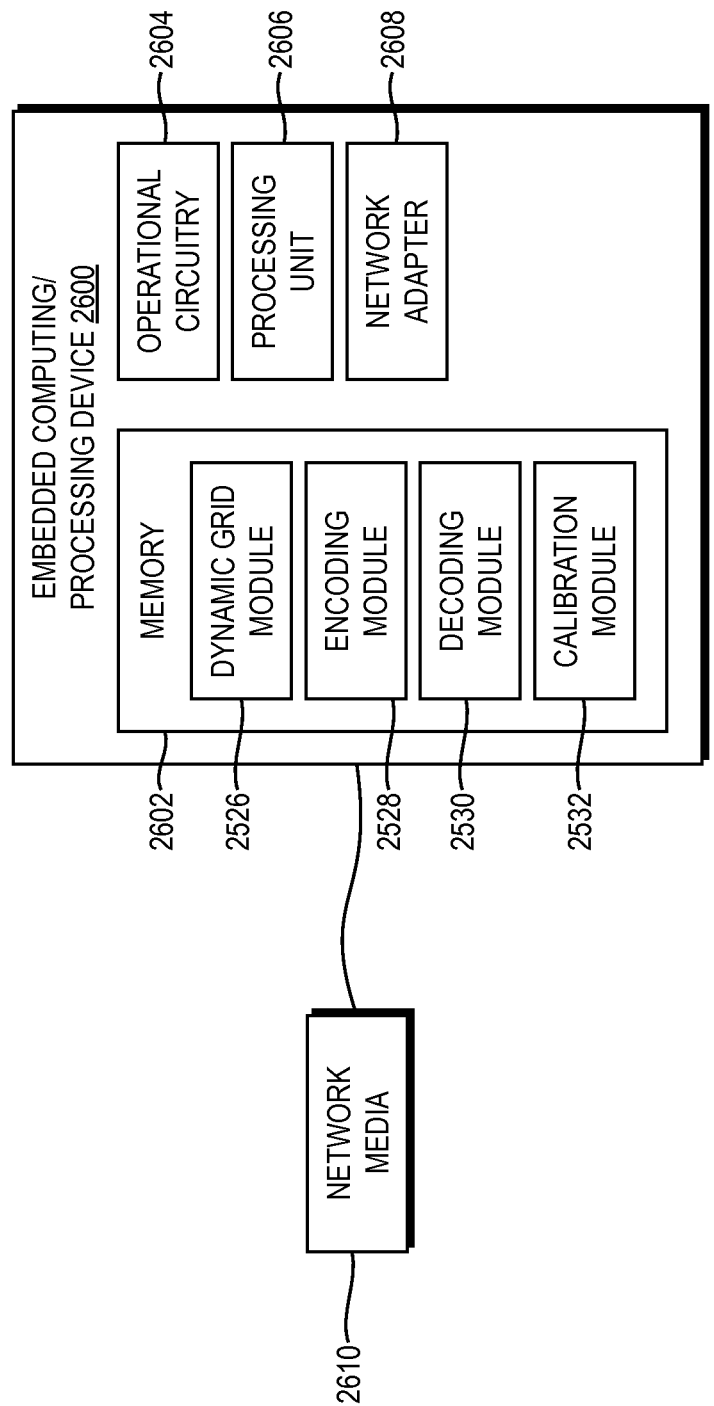
FIG. 20 is an example computational device block diagram depicting various of the components which can be used to implement various of the disclosed embodiments in a mobile device, such as a cellular phone.

Exemplary methods may also be implemented and executed on one or more embedded computing devices. FIG. 20 is a block diagram of an exemplary embedded computing or processing device 2600 that may be used to perform any of the methods or implement any of the systems and devices provided by exemplary embodiments. The embedded computing device 2600 may be any suitable device incorporating electronics to control operational functions, and in which computing and networking capabilities are embedded. For example, devices in which the computing and networking capabilities may be embedded may include, but are not limited to, audio-video equipment (e.g., audio and video recorders and players, televisions, digital cameras, digital video cameras, compact disks, digital video disks, camcorders, and the like), communication devices (e.g., telephones, cell phones, audio and video conferencing systems, the iPhone™ communication device, the iPad™ communication device, and the like), entertainment devices (e.g., set-top boxes, game consoles, and the like), and the like.

The embedded computing device 2600 may include memory 2602 that includes one or more non-transitory computer-readable media for storing one or more computer-executable instructions or software for implementing exemplary embodiments. The non-transitory computer-readable media may include, but are not limited to, one or more types of hardware memory, non-transitory tangible media, and the like. Memory 2602 may include a computer system memory or random access memory, such as DRAM, SRAM, EDO RAM, and the like. Memory 2602 may include other types of memory as well, or combinations thereof.

Memory 2602 may include a dynamic grid module 2526 for storing data and computer-readable instructions and/or software that implement and perform methods associated with setting up, configuring and/or re-configuring one or more dynamically configurable barrier grids. Memory 2602 may include an encoding module 2528 for storing data and computer-readable instructions and/or software that implement and perform methods associated with feeding image data to sequentially adjacent columns of an image display panel associated with a barrier grid. Memory 2602 may include a decoding module 2530 for storing data and computer-readable instructions and/or software that implement and perform the methods associated with selection of 2D or 3D viewing on an autostereoscopic image display system. Memory 2602 may include a calibration module 2532 for storing data and computer-readable instructions and/or software that implement and perform the methods associated with calibrating a barrier grid to an image display and/or calibrating an image display to a barrier grid.

The embedded computing device 2600 may include operational circuitry 2604 that operate device functions. The embedded computing device 2600 may include one or more processing units 2606 to provide embedded computing capabilities, for example, for setting up and/or configuring a dynamically configurable barrier grid. The processing unit 2606 may execute computer-executable instructions or software for implementing exemplary embodiments, and one or more other programs for controlling system hardware, for example, for setting up and/or configuring a dynamically configurable barrier grid. The processing unit 2606 may have hardware interfaces to the operational circuitry 2604 that operate device functions. The processing unit 2606 may be one or more microprocessors or one or more microcontrollers.

The embedded computing device 2600 may include one or more network adapters 2608 for connecting with a network media 2610 that is interconnected with a computer network. The network adapter 2608 may be a network interface card suitable to the particular network media 2610. For example, exemplary network adapters 2608 may include, but are not limited to, a built-in network adapter, network interface card, PCMCIA network card, card bus network adapter, wireless network adapter, USB network adapter, modem or any other device. The network media 2610 may be any type of wired or wireless network media including, but not limited to, Ethernet, firewire, radio frequency, television cable, Local Area Network (LAN), Wide Area Network (WAN) or the Internet through a variety of connections including, but not limited to, standard telephone lines, LAN or WAN links (for example, 802.26, T1, T3, 56 kb, X.25), broadband connections (for example, ISDN, Frame Relay, ATM), wireless connections, controller area network (CAN), or some combination of any or all of the above.

While exemplary embodiments have been shown and described with references to particular embodiments thereof, those of ordinary skill in the art can understand that various substitutions and alterations in form and detail can be made therein without departing from the scope of the invention.

Exemplary flowcharts are provided herein for illustrative purposes and are non-limiting examples of methods. One of ordinary skill in the art can recognize that exemplary methods can include more or fewer steps than those illustrated in the exemplary flowcharts, and that the steps in the exemplary flowcharts can be performed in a different order than the order shown in the illustrative flowcharts.

What is claimed is:

1. A computer-implemented method for authorizing exchange of data between a first computing system and a second computing system, the method comprising:
   receiving a vendor selection from a user of the first computing system;
   selecting, at least one Electronic Document Interchange (EDI) transaction from a plurality of available EDI transactions at the first computing system, wherein the at least one EDI transaction is associated with a specified format for exchange of data between the first and second computing system;
   testing the EDI transaction using EDI test data to facilitate exchange of the EDI test data between the first and second computing systems, wherein the test includes determining whether the date information within a field of at least one of documents in the EDI transaction is logically consistent with a date when the document in the EDI transaction was received;
   in response to an automated determination, that the EDI transaction does not conform to a specified format, rendering a display of test results including one or more of a listing of tests, a compliance report, or test data segment display, in response to testing the EDI transaction using the EDI test data to facilitate exchange of the EDI test data between the first and second computing systems to notify user of corrective measures;
   testing a corrected EDI transaction using EDI test data to facilitate exchange of the EDI data between the first and second computing systems;
   confirming by the second computing system that the EDI test data conforms to the specified format based on the exchange of EDI test data;
   in response to confirming that the EDI test data conforms to the specified format, providing, from the second computing system to the first computing system, authorization to exchange data with the second computing system;
   exchanging security certificates between the first and second computing systems;
   receiving Applicability Statement 2 (AS2) information from the first computing system, the AS2 information associated with at least one EDI transaction;
   verifying the AS2 information from the first computing system;
   receiving a parallel monitor request from the user;
   in response to the parallel monitor request, receiving another validation that the EDI transaction conforms to the specified format from a technician distinct from the automated determination;
   prompting the user of the first computing system to schedule a production date based on the AS2 information;
   receiving scheduling information from the first computing system;
   emailing approval notification to a vendor associated with the vendor selection; and
   scheduling production for a plurality of orders based on the scheduling information and the vendor associated with the vendor selection.

2. The method of claim 1, wherein the confirming that the EDI test data conforms to the specified format is based on a set of verification rules comprising structure validation rules.

3. The method of claim 2, wherein the verification rules comprise business validation rules.

4. The method of claim 1, further comprising forwarding the scheduling information to a human administrator for approval.

5. A non-transitory computer-readable medium comprising instructions to authorize exchange of data between a first computing system and a second computing system, configured to cause a computer system to:
- receive a vendor selection from a user;
- select, at least one Electronic Document Interchange (EDI) transaction from a plurality of available EDI transactions at the first computing system, wherein the at least one EDI transaction is associated with a specified format for exchange of data between the first and second computing system;
- test the EDI transaction using EDI test data to facilitate exchange of the EDI test data between the first and second computing systems, wherein the test includes determining whether the date information within a field of at least one of documents in the EDI transaction is logically consistent with a date when the document in the EDI transaction was received;
- in response to an automated determination, that the EDI transaction does not conform to the specified format, render a display of test results including one or more of a listing of tests, a compliance report, or test data segment display, in response to testing the EDI transaction using the EDI test data to facilitate exchange of the EDI test data between the first and second computing systems to notify user of corrective measures;
- test a corrected EDI transaction using EDI test data to facilitate exchange of the EDI test data between the first and second computing systems;
- confirm by the second computing system that the EDI test data conforms to the specified format based on the exchange of EDI test data;
- in response to confirming that the EDI test data conforms to the specified format, provide, from the second computing system to the first computing system, authorization to exchange data with the second computing system;
- exchange security certificates with the first computing system and the second computing system;
- receive Applicability Statement 2 (AS2) information from the first computing system, the AS2 information associated with at least one EDI transaction;
- verify the AS2 information from the first computing system;
- receiving a parallel monitor request from the user;
- in response to the parallel monitor request, receive another validation that the EDI transaction conforms to the specified format from a technician distinct from the automated determination;
- prompt the user of the first computing system to schedule a production date based on the AS2 information;
- receive the scheduling information;
- email approval notification to a vendor associated with the vendor selection; and
- schedule production for a plurality of orders based on the scheduling information and the vendor associated with the vendor selection.

6. The non-transitory computer-readable medium of claim 5, wherein the confirming that the EDI test data conforms to the specified format is based on a set of verification rules-comprising structure validation rules.

7. The non-transitory computer-readable medium of claim 6, wherein the verification rules comprise business validation rules.

8. The non-transitory computer-readable medium of claim 5, further comprising forwarding the scheduling information to a human administrator for approval.

9. A computer system to authorize exchange of data between a first computing system and a second computing system comprising:
- a network input configured to receive:
  - a vendor selection from a user;
- a processor operable via instructions stored in a memory to:
  - select, at least one Electronic Document Interchange (EDI) transaction from a plurality of available EDI transactions at the first computing system, wherein the at least one EDI transaction is associated with a specified format for exchange of data between the first and second computing system;
  - test the EDI transaction using EDI test data to facilitate exchange of the EDI test data between the first and second computing systems, wherein the test includes determining whether the date information within a field of at least one of documents in the EDI transaction is logically consistent with a date when the document in the EDI transaction was received;
  - in response to an automated determination, that the EDI transaction does not conform to the specified format, render a display of test results including one or more of a listing of tests, a compliance report, or test data segment display, in response to testing the EDI transaction using the EDI test data to facilitate exchange of the EDI test data between the first and second computing systems to notify user of corrective measures;
  - testing a corrected EDI transaction using EDI test data to facilitate exchange of the EDI test data between the first and second computing systems;
  - confirm by the second computing system that the EDI test data conforms to the specified format based on the exchange of EDI test data;
  - in response to confirming that the EDI test data conforms to the specified format, provide, from the second computing system to the first computing system, authorization to exchange data with the second computing system;
  - exchange security certificates with the first computing system and the second computing system;
  - receive Applicability Statement 2 (AS2) information from the first computing system, the AS2 information associated with at least one EDI transaction;
  - verify the AS2 information from the first computing system;
  - receive a parallel monitor request from the user;
  - in response to the parallel monitor request, receiving another validation that the EDI transaction conforms to the specified format from a technician distinct from the automated determination;
  - prompt the user of the first computing system to schedule a production date based on the AS2 information;
  - email approval notification to a vendor associated with the vendor selection; and
  - schedule production for a plurality of orders based on the scheduling information and the vendor associated with the vendor selection.

10. The system of claim 9, wherein the confirming that the EDI test data conforms to the specified format is based on a set of verification rules comprise structure validation rules.

11. The system of claim 10, wherein the verification rules comprise business validation rules.

12. The system of claim 9, further comprising forwarding the scheduling information to a human administrator for approval.

13. The system of claim 9, further comprising receiving a request to change a document state.

14. The system of claim 9, wherein the AS2 information comprises an AS2 Mailbox ID.

\* \* \* \* \*

UNITED STATES PATENT AND TRADEMARK OFFICE
CERTIFICATE OF CORRECTION

PATENT NO. : 10,997,539 B2
APPLICATION NO. : 13/772926
DATED : May 4, 2021
INVENTOR(S) : Edward H. Sherrill, Donald Lawrence Cook and Jason Paul McCrory It is certified that error appears in the above-identified patent and that said Letters Patent is hereby corrected as shown below:

In the Claims

Claim 6, Column 13, Lines 66-67, delete "rules-comprising" and insert -- rules comprising --, therefor.

Signed and Sealed this
Twenty-sixth Day of October, 2021

Drew Hirshfeld
*Performing the Functions and Duties of the
Under Secretary of Commerce for Intellectual Property and
Director of the United States Patent and Trademark Office*